United States Patent [19]

Smith et al.

[11] 4,026,012

[45] May 31, 1977

[54] METHOD FOR INSTALLING A SHIELD CONNECTOR IN A CABLE

[75] Inventors: Donald J. Smith, Woodland Hills; Paul C. Getz, Valencia, both of Calif.

[73] Assignee: Smith-Schreyer & Assoc., Inc., Woodland Hills, Calif.

[22] Filed: June 30, 1975

[21] Appl. No.: 591,466

[52] U.S. Cl. .................................. 29/628; 30/90.4; 174/78; 174/136

[51] Int. Cl.$^2$ .................... H02G 1/00; H01R 43/00

[58] Field of Search ............ 174/74 R, 78, 83, 135, 174/136, 137 R, 138 R, 138 F, 10; 29/624, 628; 339/14 R, 14 L, 95 R, 97 R; 84/322; 30/90.1, 90.4, 233, 286

[56] References Cited

UNITED STATES PATENTS

| | | | |
|---|---|---|---|
| 1,636,133 | 7/1927 | Horton | 84/322 UX |
| 2,671,820 | 3/1954 | Herbert | 174/138 F UX |
| 3,676,836 | 7/1972 | Gillemot et al. | 174/78 UX |
| 3,757,269 | 9/1973 | Baumgartner et al. | 174/78 UX |

*Primary Examiner*—Laramie E. Askin
*Attorney, Agent, or Firm*—Lyon & Lyon

[57] ABSTRACT

An insert for protecting electrical conductors in a cable during and after installation of a shield connector. The insert includes a flexible piece of plastic broadly oval in plan which may be easily inserted underneath the outer cover and shield of a cable to protect the electrical conductors contained within the cable.

1 Claim, 4 Drawing Figures

METHOD FOR INSTALLING A SHIELD CONNECTOR IN A CABLE

BACKGROUND OF THE INVENTION

The present invention is directed to an insert and a method for protecting electrical conductors in cables during and after installation of a shield connector.

In splicing and terminating cables, it is often necessary to securely attach a shield connector to the end of the shield adjacent the area where the electrical conductors of the cable are to be spliced or terminated. The placement of some shield connectors requires cutting of the outer cover and the shield of the cable longitudinally along the cable from the end for a distance of approximately one inch. The shield connector is then inserted under this longitudinal cut where it is secured to the shield. Other shield connectors are simply forced under the outer cover and shield without first making such a longitudinal cut. Often there is an inner sheath or core protector about the electrical conductors. However, damage to electrical conductors has been experienced both during the placement of the shield connector and later following installation even with such a protective sheath.

One common method for protecting the core protector and the contained electrical conductors has been to prepare a collar of electrician's tape about the core protector after placement of the shield connector. This is accomplished by first wrapping a piece of electrician's tape with the mastic side out about the core protector. Then, a piece of electrician's tape with the mastic side in is positioned about this first piece. The collar thus formed is then forced along the core protector underneath the shield connector, the shield and the outer cover. This technique involves time, does not insure proper placement of the collar and has generally been found to be a less than acceptable method. This technique is further complicated and less satisfactory when shields are used without first making a longitudinal cut along the outer cover and shield.

SUMMARY OF THE INVENTION

The present invention employs a thin, flexible sheet of plastic, broadly oval in plan, which may be deformed to approximately the curvature of a cable and forced beneath the shield and outer cover of a cable containing electrical conductors. This sheet provides protection for core protectors and electrical conductors at the specific location where a shield connector is to be located. Thus, the core protector and the electrical conductors may be easily and assuredly protected during and after installation of the shield connector.

Accordingly, it is an object of the present invention to provide an apparatus for protecting the electrical conductors of a cable.

It is another object of the present invention to provide a method for protecting the electrical conductors of a cable.

Other and further objects and advantages will appear hereinafter.

DETAILED DESCRIPTION OF THE DRAWING

Figure 1:
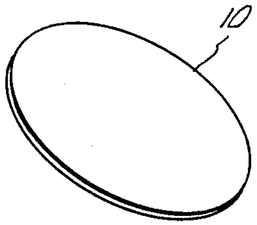
FIG. 1 is a perspective view of an example of the present invention.

Looking to FIG. 1, an insert 10 of the present invention is disclosed as being broadly oval in plan. The thickness of the insert 10 and the material of construction must be such that the insert 10 may be readily flexed across its width to conform approximately to the curvature of the cable in which the insert is to placed. It is recommended that thinner inserts be employed for cables below this diameter. The thickness must also be such that the insert will not buckle when inserted into the end of a cable beneath the outer cover and shield.

The actual size of each insert 10 and its broadly oval configuration are designed for maximum utility and versatility in accommodating a wide range of cable diameters. The length of the insert 10 is sufficient to allow an appropriately sized longitudinal cut in the outer cover and shield of a cable for receipt of a shield connector. This requires that the insert 10 extend beneath the outer cover and shield at least as far into the cable as the cut will extend. It is preferable that the width not exceed one-half the circumference of the cable in which it is to be placed. When the width of the insert 10 exceeds one-half the circumference of the cable, the insert 10 must be wrapped more than halfway around the cable which adds to the difficulty in placement of the insert. At the same time, there is no benefit to be gained fromm such an extensive covering of the conductors as only one side of the cable is subjected to the cutting of the cover and the placemet of the shield connector. The broadly oval shape at least at one end of the insert 10 prevents sharp corners and flat edges from hanging up on the cable itself when the insert is being placed under the outer cover and shield.

In one preferred embodiment, the maximum width is 3.2 cm. (1¼ inches), the length is 6.4 cm. (2½ inches) and the thickness of the insert 10 is .0305 cm. (0.012 inch). The material of construction is acetate butyrate. The above preferred embodiment is useable on cables down to approximately 2 cm. (¾ inch) in diameter.

Figure 2:
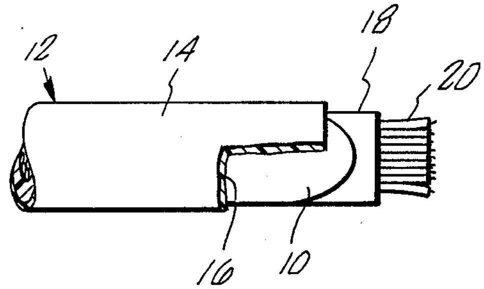
FIG. 2 is a plan view of the present invention in place in a cable with a portion of the outer cover and shield of the cable cut away.
Figure 3:
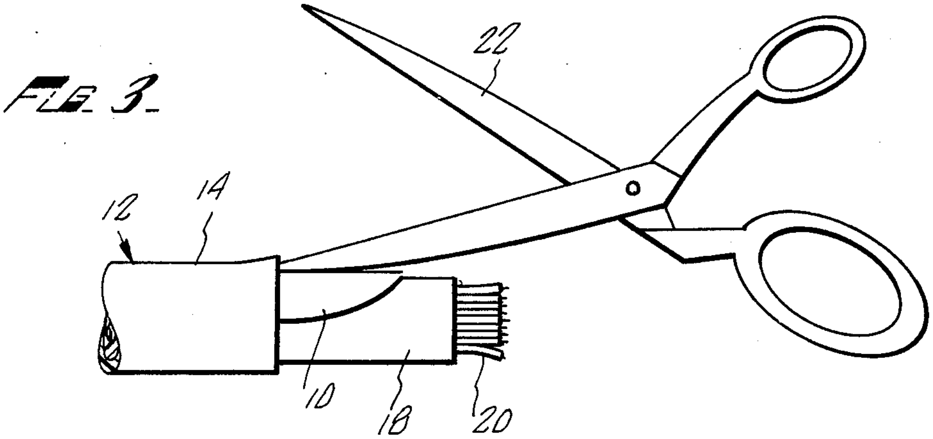
FIG. 3 is an elevation of the present invention in place in a cable and illustrating cutting of the outer cover and shield.
Figure 4:
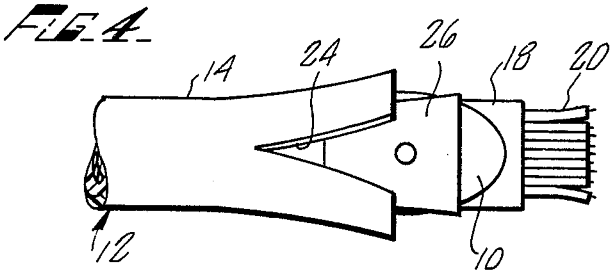
FIG. 4 is a plan view of the present invention in place in a cable with a shield connector.

FIGS. 2 through 4 illustrate the placement and utility of the present invention. In FIG. 2, the insert 10 is shown positioned in a cable 12 having an outer cover 14, a shield 16, a core protector 18 and electrical conductors 20. In FIG. 3, shears 22 are shown forming a cut in the outer cover 14 and shield 16 above an insert 10. It can be seen in FIG. 3 that the insert 10 protects the core protector 18 and the electrical conductors 20. In FIG. 4, a cut 24 in the cable 12 is shown to permit the receipt of a shield connector 26. The shield connector is also placed over the insert 10 thereby allowing the insert 10 to protect the core protector and the electrical conductors. The insert 10 may remain after placement of the shield connector 26 to prevent later relative movement of the shield connector from damaging the cable at such time as the cable may be spliced. The insert 10 works equally well with shield connectors not requiring the initial cutting of the outer cover and shield prior to placement of the shield connector.

Thus, means are provided for protecting a cable from a shield connector and the act of placing a shield connector. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A method for installing a shield connector in a cable having electrical conductors, a conductive shield surrounding the electrical conductors, and an outer cover surrounding the conductive shield, including the steps of inserting a thin plastic piece between the shield and the electrical conductors of a cable;

cutting the outer cover and shield of the cable on the inserted thin plastic piece; and inserting a shield connector between the cut shield and the inserted thin plastic piece.

* * * * *